(12) United States Patent
Kameyama et al.

(10) Patent No.: US 7,004,789 B2
(45) Date of Patent: Feb. 28, 2006

(54) WATERPROOF STRUCTURE BETWEEN CABLE AND HOUSING

(75) Inventors: Isao Kameyama, Shizuoka (JP); Takashi Toi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/864,319

(22) Filed: Jun. 10, 2004

(65) Prior Publication Data
US 2005/0009394 A1    Jan. 13, 2005

(30) Foreign Application Priority Data
Jun. 13, 2003   (JP) ............................. P2003-168879

(51) Int. Cl.
*H01R 13/40*   (2006.01)

(52) U.S. Cl. ................... 439/587; 439/588; 439/274; 439/275; 439/279; 439/932

(58) Field of Classification Search ................ 439/587, 439/588, 274, 275, 279, 932
See application file for complete search history.

(56) References Cited

U.S. PATENT DOCUMENTS

| | | | | |
|---|---|---|---|---|
| 3,963,295 A | * | 6/1976 | Askman et al. .............. | 439/276 |
| 5,580,264 A | * | 12/1996 | Aoyama et al. ............. | 439/587 |
| 5,928,033 A | * | 7/1999 | Kato et al. .................. | 439/587 |
| 6,321,021 B1 | * | 11/2001 | Cairns et al. ............... | 439/587 |

* cited by examiner

*Primary Examiner*—Tho D. Ta
(74) *Attorney, Agent, or Firm*—Finnegan, Henderson, Farabow, Garrett & Dunner, L.L.P.

(57) ABSTRACT

A waterproof structure between a cable and a housing is structured not spoiling a waterproof performance even if a cable is bent drawing a rapid curve. The waterproof structure between the cable and the housing comprises the cable led from the housing, a waterproof member closely attached to the housing and the cable, and a peel-prevention member for preventing peeling of the waterproof member with respect to the cable being bent, and is characterized in that the peel-prevention member is mounted on the cable and wrapped internally by the waterproof member. The waterproof member is formed with a hot melt material, and the peel-prevention member is formed with a material having excellent adhesion to the hot melt material. A shrinkage tube is served as the peel-prevention member.

3 Claims, 4 Drawing Sheets

PRIOR ART

WATERPROOF STRUCTURE BETWEEN CABLE AND HOUSING

BACKGROUND OF THE INVENTION

1. Field of the Invention

This invention relates to a waterproof member between a cable and a housing, which is composed, for example, to a waterproof connector of such as a vehicle.

2. Related Art

FIG. 4 shows a conventional waterproof structure between the cable and the housing.

Aiming at the waterproof of a connector 101, a hot melt mold is reduced in practice in order to form a waterproof member 160 with a hot melt material. The hot melt material is meant by a base material of a thermoplastic synthetic resin or rubber.

Explanation will be made in the following description on the basis in order of producing processes for composing the waterproof connector 101. Conductors 191 of a cable 190 are press-attached to female terminals 110 to provide a connection between the cable 190 and the female terminals 110. Next, an inner housing 130 is fitted therein with the female terminals 110, subsequently followed by setting the inner housing 130, an outer housing 150, and the cable 190 into a metal mold (not shown). Then, a thermoplastic resin is poured into the mold to perform a hot melt mold of the waterproof member 160. The inner housing 130 and the outer housing 150 are joined, whereby a housing 120 is composed.

However, in the above mentioned conventional waterproof structure between the cable and the housing, as shown in FIGS. 5A and 5B, when the cable 190 is bent as drawing steep or rapid curves, the waterproof member 160 and the cable 190 are peeled, and a water goes into the peeled parts, so that there has been an apprehension that a waterproof performance goes down between the cable 190 and the housing 120 (FIG. 4).

In addition, paying attention to an environment, an insulating cover 193 of the cable 190 has been changing from cables having polyvinyl chloride-made insulating cover to non-halo cables. The non-halo cable is meant by such cables having the insulating cover 193 without containing halogen compound carrying such as chloride, and for example, a cable 190 not generating noxious gas as dioxin if it is burnt. It has been feared that in case the non-halo cable is connected to the waterproof connector 101, the waterproof member 160 is easy to peel with respect to the cable 190, and the waterproof performance declines.

SUMMARY OF THE INVENTION

In view of the above mentioned regards, it is an object of the invention to provide such a waterproof structure between the cable and the housing, which does not spoil the waterproof performance even if the cable is bent drawing the rapid curve.

For accomplishing the above object, the waterproof structure between the cable and the housing depending on a first aspect of the invention, comprises the cable led from the housing, a waterproof member closely attached to the housing and the cable, and a peel-prevention member for preventing peeling of the waterproof member with respect to the cable being bent, and is characterized in that the peel-prevention member is mounted on the cable and wrapped internally by the waterproof member.

The above mentioned structure may beforehand avoid occurrences of inconveniences such as extreme peeling of the waterproof member with respect to the cable being bent, a water invasion in spaces made at the peeled parts, and spoiling of the waterproof performance thereby between the cable and the housing. When the cable is bent, this bending movement of the cable is restrained by a substantially ring-shaped peel prevention member to avoid the peel progressing of the cable and the waterproof member, so that the waterproof performance may be secured accordingly.

The waterproof structure between the cable and the housing depending on a second aspect of the invention is, in the first aspect, is provided in that the waterproof member is formed with a hot melt material, and the peel-prevention member is formed with a material having excellent adhesion to the hot melt material.

With the above mentioned structure, since the waterproof member is formed with the hot melt material excellent in formability, the waterproof structure between the cable and the housing is efficiently composed. The peel prevention member is formed with the material having excellent adhesion to the hot melt material, and this may beforehand avoid the occurrences of inconveniences that when the cable is bent, the peel prevention member is peeled with respect to the waterproof member to make the spaces at the peeled parts, into which the water goes and spoils the waterproof performance of the connector.

The waterproof structure between the cable and the housing depending on a third aspect of the invention is, in the first or second aspects, is provided in that a shrinkage tube is served as the peel-prevention member.

After mounting the shrinkage tube on the cable, the shrinkage tube is tightened leaving no space between them, and the above mentioned structure may beforehand avoid the occurrences of inconveniences that when the cable is bent, the peel prevention member is peeled with respect to the waterproof member to make the spaces at the peeled parts, into which the water goes and spoils the waterproof performance of the connector.

DETAILED DESCRIPTION OF THE PREFERRED EMBODIMENTS

Explanation will be made in detail to one embodiment of the waterproof structure between the cable and the housing depending on the invention with reference to the attached drawings.

Figure 1:
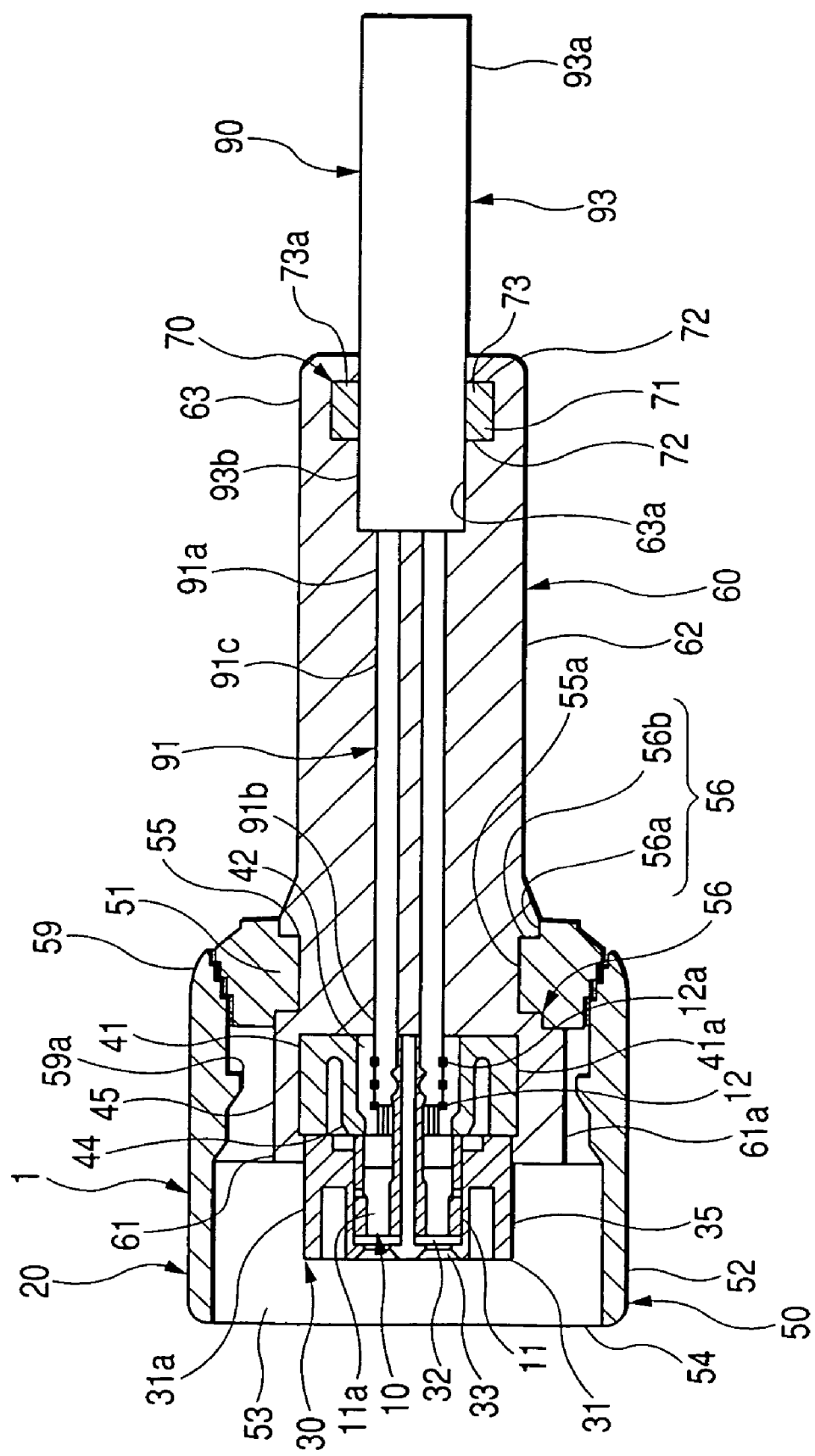
FIG. 1 is a cross sectional view showing one embodiment of the waterproof structure between the cable and the housing depending on the invention.

FIG. 1 is one embodiment of the waterproof structure between the cable and the housing depending on the invention.

As shown in FIG. 1, a side where the cable 90 is led from the housing 20 having an inner housing 30 and an outer housing 50, is called as a rear side of the connector 1 or the housing 20, and an opposite side thereto is called as a front side of the connector 1 or the housing 20. A definition of "rear and front" in the instant specification is for convenience explaining the connector 1 or the housing 20.

The waterproof structure between the cable and the housing of this invention has the waterproof structure comprising at least the cable 90 led from the housing 20, the waterproof member 60 closely attached to the housing 20 and the cable 90, and the peel prevention member 70 for preventing peeling of the waterproof member 60 with respect to the cable 90 being bent.

The housing 20 can accommodate electric parts such as the terminals 10 or electronic machinery (not shown). The housing 20 is so structured as to furnish the inner housing 30 receiving the terminals 10 and the outer housing 50 receiving the inner housing 30. As the housing, all types of housings are available. Further, as the cables, all types of cables are available such as electric wires, optical fibers and others.

In the inner housing 30 made of synthetic resin, metal-made female terminals 10 are inserted as the terminals 10. The inner housing 30 is supported within the outer housing 50 made of synthetic resin. To the female terminals 10 in the inner housing 30, conductors 91 of the cable 90 are connected under electrical conductivity. From the interior of the inner housing 30, the respective conductors are led to compose the cable 90.

Figure 2:
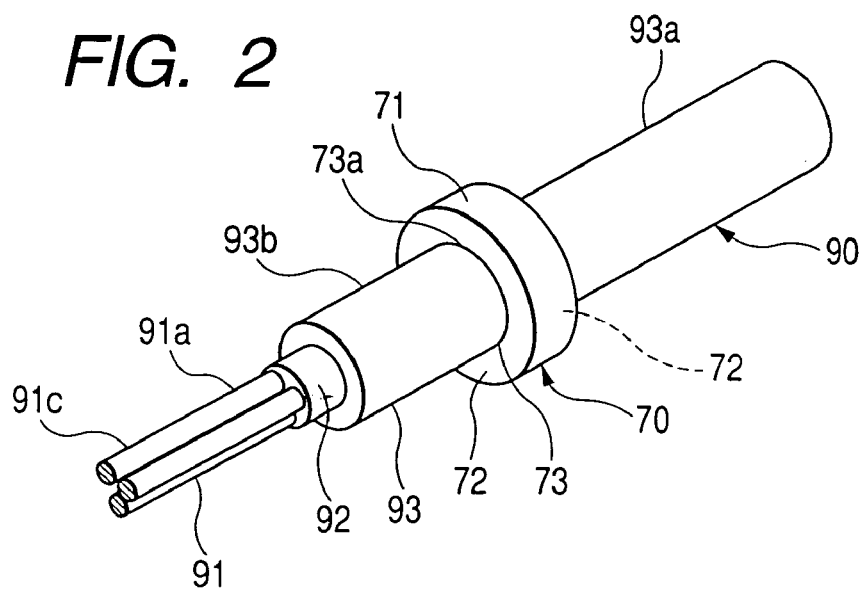
FIG. 2 is a perspective view showing a state that the peel prevention member is mounted on the cable.

FIG. 2 is a perspective view showing a state that the peel prevention member 70 is mounted on the cable 90.

As shown in FIGS. 1 and 2, the respective conductors 91 of the cable 90 are protected on the way by covering a shielding material 92 (FIG. 2) made of Al-foil and an insulating cover 93 made of a synthetic polymer material.

As shown in FIG. 1, the waterproof member 60 is formed by closely attaching the inner housing 30, the outer housing 50 and the cable 90. The almost cylindrical waterproof member 60 is attached and at the same time closely joined to an almost cylindrical rear half part 41 and a cylindrical front half part 31. Further, to the cylindrical outer housing 50, the cylindrical waterproof member 60 is attached and at the same time closely joined, while the cylindrical waterproof member 60 is attached and at the same time closely joined to the cable 90 almost cylindrical in cross section.

The waterproof member 60 is formed by molding a flexible synthetic polymer material. An almost ring-shaped peel prevention member 70 is furnished on the cable 90 for preventing peeling of the inner circumferential face in the waterproof member 63a with respect to the outer circumferential face 93a in the cable 90 being bent. The peel prevention member 70 is formed with the synthetic polymer material. In substitution for the synthetic polymer material, for example, such a peel prevention member (70) using a metallic material is also available. The waterproof member 60 is closely joined to the peel prevention member 70. To the ring-shaped peel prevention member 70, the cylindrical waterproof member 60 is attached and at the same time closely joined.

The peel prevention member 70 is formed as an endless ring shaped member detachably mounted on an end part 93b of the inner circumferential face 93a of the insulation cover 93 of the cable 90 being almost cylindrical in cross section. The endless ring shaped peel prevention member 70 has a through-hole 73 for inserting the cable 90. The peel prevention member 70 is mounted on the cable 90 and is not exposed outside of the waterproof member 60 but is wrapped internally by the waterproof member 60. The outer circumferential face 71 of the endless ring shaped peel prevention member 70 and face parts of both sides of the same are all wrapped internally by the waterproof member 60. The inner circumferential face 73a of the through-hole 73 of the peel prevention member 70 and an outer circumferential face 93a of the insulation cover 93 of the cable 90 are closely attached.

The waterproof connector 1 is composed to have the terminals 10, the housing 20, and the waterproof member 60. The waterproof connector 1 is connected with the cable 90, so that the waterproof structure of the connector is structured. This cable 90 is connected to electrical, electronic parts, or the electronic machinery within an electrically connecting box (not shown) mounted in a vehicle (not shown).

With use of the peel prevention member 70, the occurrences of inconveniences may be beforehand avoided that when the cable is bent drawing the rapid curve, or after the cable 90 is repeatedly bent, the inner circumferential face 63a of the waterproof member 60 is considerably peeled with respect to the outer circumferential face 93a of the cable 90 to make the space at the peeled part, into which the water goes and spoils the waterproof performance of the connector.

Further, when the cable 90 is bent as drawing the rapid curve or even if it is bent repeatedly, the bending actuation of the cable 90 is restrained or corrected by the ring shaped peel prevention member 70, so that the cable 90 and the waterproof member 60 are avoided from the peeling progression. Accordingly, the waterproof function between the cable 90 and the housing 20 or of the connector 1 is secured for a long period of time.

Figure 4:
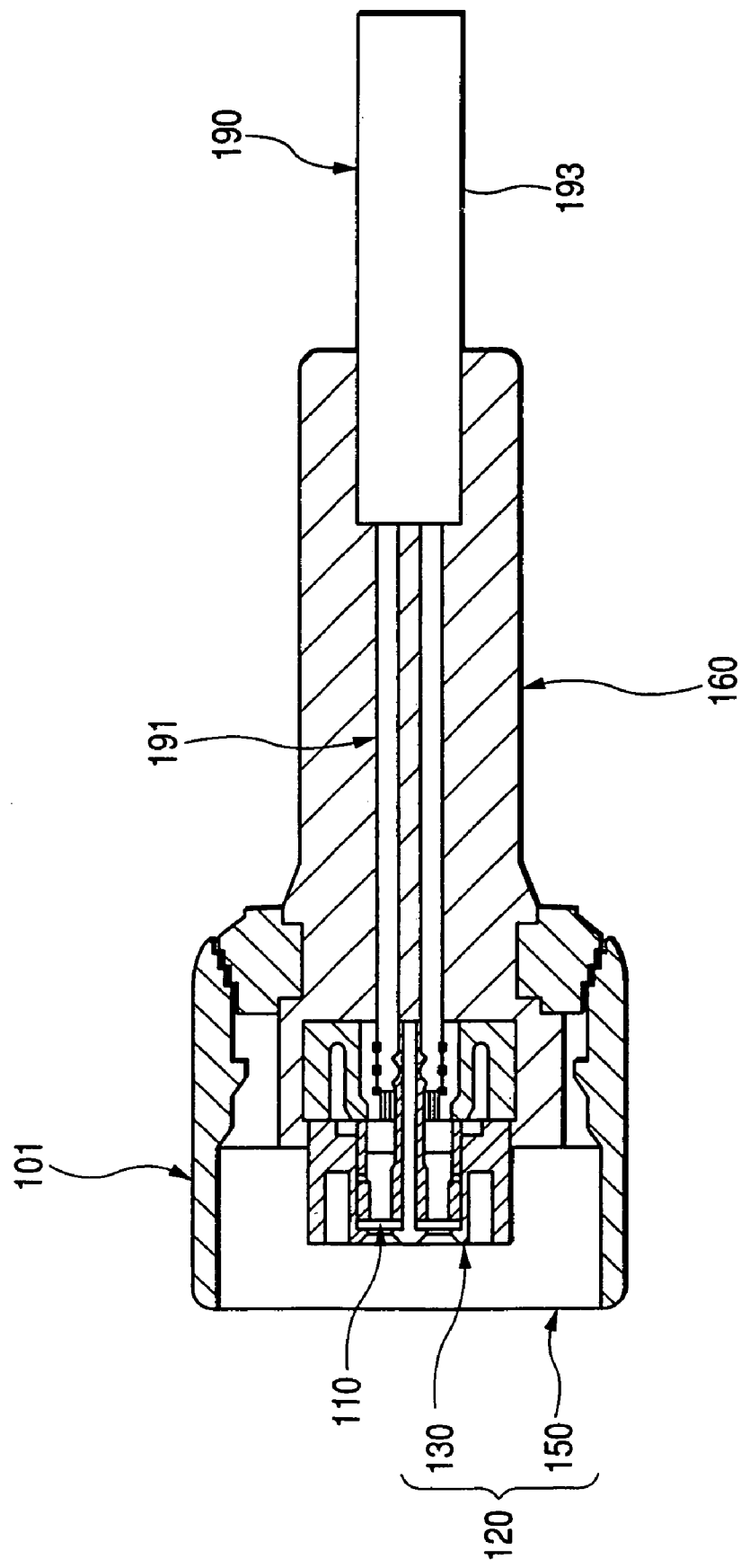
FIG. 4 is a cross sectional view showing one embodiment of the waterproof structure between the cable and the housing of the prior art.
Figure 5A:
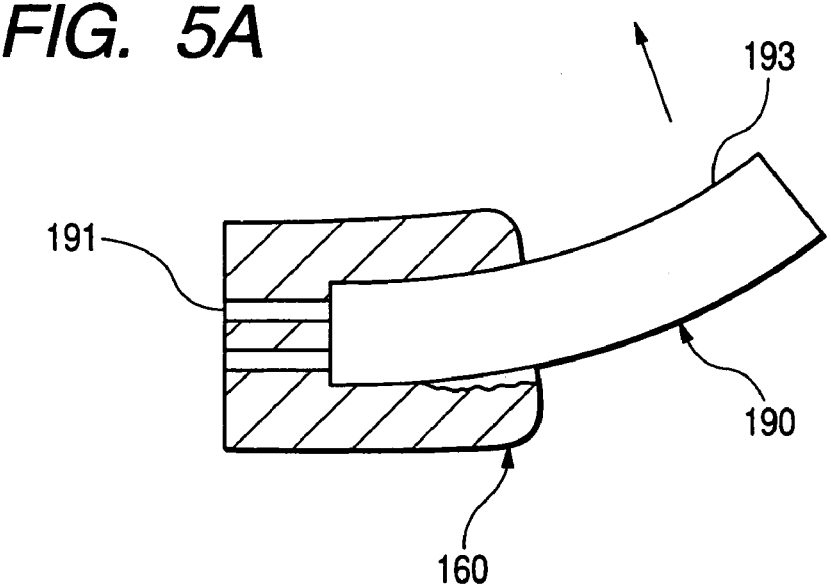
FIGS. 5(A) and (B) are explaining conditions showing the waterproof members peeled with respect to the cable.
Figure 5B:
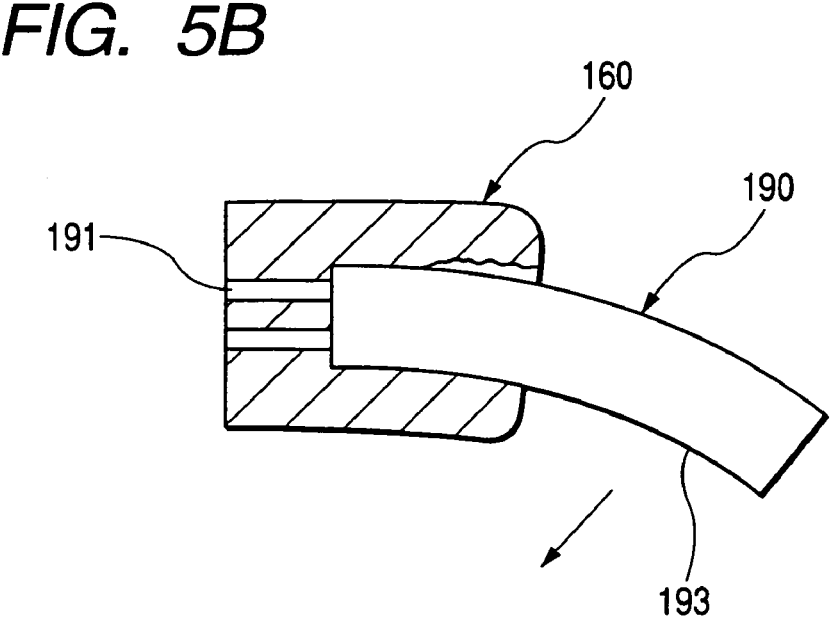

Since the peel prevention member is not furnished in the conventional waterproof structure between the cable and the housing shown in FIG. 4, as shown in FIGS. 5A and 5B, when the cable 190 is bent as drawing the steep or rapid curves, the waterproof member 160 and the cable 190 are peeled, and the water goes into the peeled parts, so that there has been an apprehension that the waterproof performance goes down between the cable 190 and the housing 120 (FIG. 4). However, in the inventive waterproof structure between the cable and the housing shown in FIG. 1, the peel prevention member 70 is furnished, so that the waterproof function between the cable 90 and the housing 20 is maintained continuously.

As in FIG. 1, the outer housing 50 made of synthetic resin formed by an injection molding method is furnished with an almost cylindrical hood part 52 protecting the inner housing 30 made of synthetic resin inserted with the metal-made female terminal 10. By combination of the inner housing 30 and the outer housing 50, the housing 20 is structured. The inner housing 30 constructs an inside of the housing 20, while the outer housing 50 constructs an outside thereof. An opposite connector (not shown) is inserted into a receptacle 53 from the opening 54 of the outer housing 50 constructing the waterproof connector 1.

The inner housing 30 of synthetic resin is furnished with the cylindrical front half part 31 of synthetic resin and the cylindrical rear half part 41 of the same. The front half part 31 of the inner housing 30 is formed by the injection molding method, and the receptacle 32 of the front half part 31 of the inner housing 30 is formed in complicated shape. The rear half part 41 of the inner housing 30 is also formed by the injection molding method, and the receptacle 42 of the rear half part 41 of the inner housing 30 is formed in complicated shape having an engaging lance.

In regard to the front half part 31 of the inner housing 30 having the receptacle 32 of the complicated shape as well as the rear half part 41 of the inner housing 30 having the receptacle 42 of the complicated shape, the inner housing 30 is injection-molded by dividing into two members of the front half part 31 and the rear half part 41 for easy production at high productivity.

An electric wire 12 of the female terminal 10 is received in a receptacle chamber 42 of the rear half part 41 of the inner housing. The female terminal 10 is engaged with the rear half part 41 of the inner housing 30 by the flexible engaging lance 44 provided at the rear half part 41 of the inner housing 31.

Before the female terminal 10 is inserted in the rear half part 41 of the inner housing 31, the conductor 91 of the cable 90 is in advance caulked at an end portion 91b by a crimp piece 12a provided at an electric wire connecting part 12 of the female terminal 10, so that the female terminals 10 and the cable 10 are securely connected under electric conductivity.

The front half part 31 constituting the inner housing 30 is attached to the rear half part 41 constituting the inner housing 30, whereby the respective female terminals 10 are fixed to the interiors of the front half part 31 and the rear half part 41 of the inner housing 30, so that the female terminals 10 are securely held by the inner housing 30. In addition, the cylindrical electric shrinking part 11 constituting the female terminal 10 is received in the receptacle chamber 32 of the front half part 31 of the inner housing 30. The front half part 31 of the inner housing 30 holds the electrically connecting part 11 of the female terminal 10, and at the same time serves as a front holder 31 for protecting the electric part 11 of the female terminal 10 from exteriors.

Round pin shaped male and female terminals of the opposite connectors (not shown) are inserted in the cylindrical receptacle chamber 11a of the female terminals from the front side opening 33 of the front half part 31 constituting the inner housing 30, and both contact thereby, so that the female terminals 10 and the male and female terminals (not shown) are securely connected under electric conductivity.

The waterproof member 60 made of synthetic polymer closely holds, under leaving no space, one part of a circumferential wall 35 of the front half part 31 constituting the inner housing 30, a circumferential wall 45 of the rear half part 41 constituting the inner housing 30, ends 91c of the conductors 91 of the cable 90, an end 93b of the insulating cover 93 of the cable 90, and the peel prevention member 70. The waterproof member 60 is closely fixed, under leaving no space, in a round attaching hole 55 provided in a basic wall 51 of the outer housing 50.

In one end 61 of the waterproof member 60, one part of the front half part 31 constituting the inner housing 30 and the rear half part 41 constituting the inner housing 30 are wrapped internally. The respective conductors 91 of the cable 90 are wrapped internally in an almost intermediate part 62 of the waterproof member 60. Besides, in the other end 63 of the waterproof member 60, the end 93b of the insulating cover 93 of the cable 90 and the peel prevention member 70 are wrapped internally.

The waterproof member 60 closely holds, under leaving no space, one part of an outer circumferential face 31a of the front half part 31 constituting the inner housing 30, an outer circumferential face 41a of the rear half part 41 constituting the inner housing 30, outer circumferential faces 91a of the conductors 91c of the cable 90, an outer circumferential face 93a of an end 93b the insulating cover 93 of the cable 90, an outer circumferential face 71, and both sides 72 of the peel prevention member 70.

At the inside and the outside of the attaching hole 55 formed in a basic wall 51 forming the outer housing 50, a pair of steps 56 are provided. The steps 56 have the inner circumferential face 56a almost parallel along the length of the cable 90 and an almost ring shaped end 56b perpendicular with the length of the cable 90. The waterproof member 60 is secured to the outer housing 50 under a condition where the waterproof member 60 is closely joined and at the same time attached to the inner circumferential face 56a and the end 56b of the pair of steps 56 and the inner circumferential face 55a of the attaching hole 55 formed in the basic wall 51 of the outer housing 50.

Securing the waterproof member 60 to the outer housing 50 under such conditions, it is possible to avoid that the waterproof member 60 positionally deviates with respect to the outer housing 50, or the waterproof member 60 gets out of the outer housing 50, and the waterproof member 60 is continuously fixed to the outer housing 50 for the long period of time.

As shown in FIG. 2, the cable 90 is structured as a lengthy body almost circular in cross section furnishing a plurality of conductors 91 transmitted with signals, a shield member 92 wound on the circumference of the conductor 91 for shielding noises issued from the respective conductors 91, and the insulating cover 93 protecting the conductors 91 and the shield member 92 from exteriors. The cable 90 is mounted with the peel prevention member 70 on the outer circumferential face 93a.

As the conductor 91, an Al-wire has been employed because of having excellent corrosion resistance against, for example, the water. The conductor 91 is rendered to be a core 91. As a conductor (91), a cable (90) using, for example, a soft Cu-wire is applicable. The conductors 91 are respectively used to an electric source, an earth, or signals.

Besides, as the shield member 92, the Al-foil 92 has been used because it is excellent in noise shielding capacity, and thin in thickness enabling the wire to be slim.

For not giving bad influences to the environment, the insulating cover 93 has been formed by using synthetic resin materials not containing chlorine. As an insulating cover (93), such an insulating cover is applicable, which is formed by, for example, a synthetic rubber material or a mixture of synthetic resin material and synthetic rubber material not including Cl. As the synthetic resin materials containing no Cl, polyolefin based resins without containing Cl have been used. As the polyolefin based resin materials as basic materials, there are listed, for example, polyethylene resin or polypropylene resins.

For example, to 100 weight parts of the basic synthetic resin, metal hydroxide such as magnesium hydroxide is added at 30 to 200 weight parts, preferably 60 to 120 weight parts and uniformly mixed, so that it is possible to improve fire-resistance of the wire without spoiling flexibility requisite to characteristics of the same. The cable 90 is composed as the so-called non-halo cable. The cables (90) tied up in a harness are also usable.

Opposite connectors (not shown) are inserted into the receptacle 53 of the outer housing 50 from the opening 54 of the front half part 31 of the outer housing 50 of the waterproof connector 1 shown in FIG. 1, so that the female terminals 10 of the waterproof connector 1 and the male and female terminals (not shown) of the opposite connector are connected under electric conductivity.

At this time, the inner circumferential face of the housing of the opposite connector (not shown) is closely attached to the outer circumferential face 61a of one end 61 of the waterproof member 60 positioning in the receptacle 53 of the outer housing 50 of the waterproof connector 1, whereby the water is prevented from going into the waterproof connector 1 and the opposite waterproof connector (not shown).

Further, an engaging portion 59a provided in a flexible locking arm 59 of the outer housing 50 of the waterproof connector 1 engages an engaging portion (not shown) provided in a housing (not shown) of the opposite connector (not shown), whereby the waterproof connector 1 and the opposite waterproof connector (not shown) are continuously and securely connected for the long period of time.

The waterproof member 60 is formed with the hot melt material. The peel prevention member 70 is formed with a material having excellent adhesion to the hot melt material. As materials having the adhesion excellent to the hot melt material, there may be enumerated, for example, rubber materials, resin materials, or synthetic polymer material such as the hot melt material homogeneous to the waterproof member 60.

Since the waterproof member is formed with a hot melt material excellent in formability, the waterproof structure between the cable and the housing is efficiently composed. The peel prevention member 70 is formed with the material having excellent adhesion to the hot melt material, and this may beforehand avoid the occurrences of inconveniences that when the cable 90 is bent drawing the rapid curve or after it is repeatedly bent, the peel prevention member is peeled with respect to the waterproof member to make the spaces at the peeled parts, into which the water goes and spoils the waterproof performance of the connector.

By use of the hot melt material, the waterproof member 60 is formed under the condition of being closely joined to the inner housing 30 having the front half part 31 and the rear half part 41, the outer housing 50, and the cable 90. The waterproof member 60 is formed as one body of the inner housing 30 having the front half part 31 and the rear half part 41, the outer housing 50, and the cable 90.

Being formed as the hot melt material, a flexible material is used. In substitution for the hot melt material, the waterproof member (60) formed with, for example, a rubber material may be used.

In the waterproof connector 1 using the waterproof member 60 made of the hot melt material material, the peel prevention member 70 shaped in the endless ring is interposed to fix the waterproof member 60 and the cable 90 for avoiding the occasion that the waterproof of the connector 1 cannot be kept when the cable 90 is bent, the waterproof member 60 is peeled with respect to the cable 90, Further explanation will be made to the hot melt material forming the waterproof member 60.

Such a hot melt material is preferable which is fused by heating to a determined temperature, and is formed with a property having flexibility or elasticity. The hot melt material is also called as a hot melt adhesive or a hot melt type adhesive, and is one of especial adhesives. The hot melt material is softened or molten by heating, and is poured into a metal mold (not shown) under this condition, and rapidly solidified by cooling.

Owing to this property, the forming work is executed by use of the hot melt material, and the productivity of formed bodies goes up because of speedy formation. The hot melt material is made an adhesive based on the thermal plastic resin, a so-called resin-solder typed adhesive.

As base polymers of the hot melt material, there are enumerated, for example, a copolymer (EVA) of ethylene-vinyl acetate, a copolymer (EEA) of ethylene-ethylacrylate, polyamide (PA), polyurethane (PUR), polyethylene (PE), polyester, or atactic polypropylene based ones. The water proof member 60 (FIG. 1) is formed by using the hot melt material having base polymers of ethylene-vinyl acetate, polyamide, or polyester based ones.

The hot melt material is desirable where the base polymer is a main agent which is mixed with at least one of rosin or modified rosin and their derivatives, or tackifier such as terpene based resin like synthetic polyterpene, wax, plasticizer, anti-oxidant such as hindered based multivalent phenol or a filler as age-resistor. Further, as the hot melt material, for example, a simplex of the base polymer like polyester or polyamide is applicable.

The property of EVA based hot melt material is determined by the amount of containing the base polymer and vinyl acetate, and compounding agents. For example, if the EVA based polymer is adjusted as ethylene to be 60 to 95% and vinyl acetate to be 40 to 50%, the melting point is adjusted to be around 60 to 100° C. by these ratios. As the content of vinyl acetate becomes more, the melting point of the EVA based hot melt material is controlled to be low. For example, the melting point of the EVA based hot melt material where vinyl acetate is controlled to be 25 to 35%, exceeds around 60° C. and below around 70° C.

The EVA based hot melt material is heated while adjusting to be above said melting point and below a thermal decomposition temperature, whereby it is attached to a determined object. As a mate component of ethylene other than vinyl acetate, copolymer polymerized by using ethyl acrylate, acrylic acid, methacrylic acid is also usable.

Comparing with other hot melt materials, the EVA based hot melt material has more or less difficulties in chemical resistance or adhesive strength. This is because the melting point of generally and widely used EVA itself is around 70 to 90° C., and thermal decomposition occurs at around 200 to 250° C. When using the EVA based material, an attention is sometimes paid to usage requiring heat resistance or durability. Being an economical material, if the EVA hot melt material is applied to the waterproof member 60, a cost for the waterproof connector 1 may be reduced. As the EVA hot melt material, there is, for example, YX-363 (trade name) made by Shin-Etsu Kagaku Kogyo LTD.

As the polyamide based hot melt material, there are enumerated copolymer polyamides being main of dimer acid based polyamide 11 and polyamide 12, multi-copolymer with polyamide 12 and polyamide 6 or polyamide 6-6. As the polyamide based hot melt material, there is, for example, Tomide (trade name) made by Fuji Kasei Kogyo Ltd.

The polyester based hot melt material is a copolymer being main of terephthalic acid and 1,4 butanediol, and adhesion is controlled by appropriately adjusting a melting point, glass transition temperature (Tg), crystallinity, and molecular weight. The polyester based hot melt material is excellent in heat resistance, adhesive strength, electric characteristic, and solvent resistance. As the polyester based hot melt material, there is, for example, Byron (trade name) RN9600 made by Toyo Boseki Ltd.

As the peel prevention member 70, the endless ring shaped shrinkage tube 70 without slit is used. As the shrinkage tube 70, for example, the thermal shrinkage tube 70 is used. The thermal shrinkage tube is meant by a tube shrunken by heating. Once the thermal shrinkage tube 70 is shrunken, it does not recover to an initial size. As the thermal shrinkage tube 70, a tube based on a radiation cross link is used.

Figure 3A:
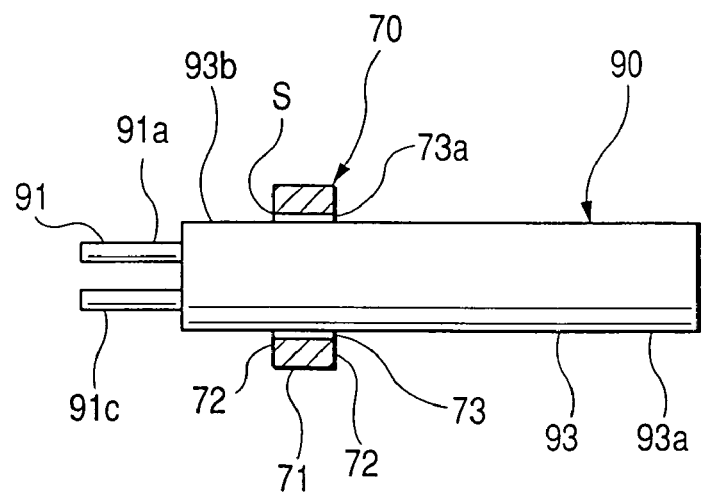
FIG. 3(A) is a cross sectional view showing a condition before the peel prevention member is mounted on the cable.
Figure 3B:
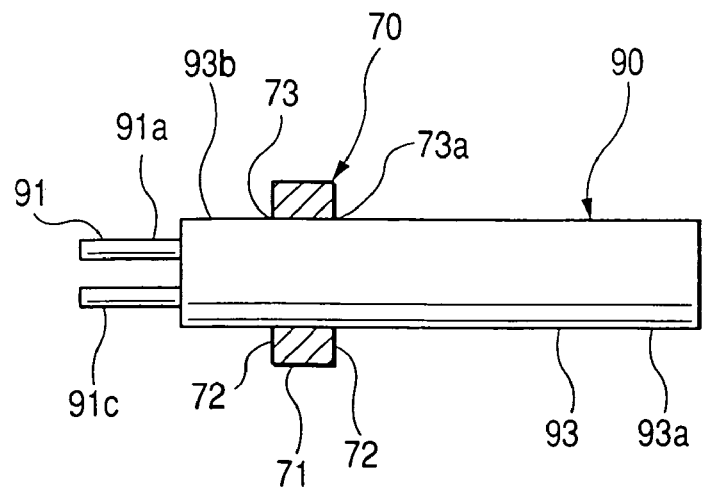
FIG. 3(B) is a cross sectional view showing a condition that the peel prevention member is mounted on the cable.

FIG. 3A is a cross sectional view showing a condition before the peel prevention member 70 is mounted on the cable 90, and FIG. 3B is a cross sectional view showing a condition that the peel prevention member 70 is mounted on the cable 90.

As shown in FIG. 3A, the thermal shrinkage tube 70 is mounted on the end 93b of the cable 90 with the space S, and then the thermal shrinkage tube 70 is heated above 120° C. Thereby, as shown in FIG. 3B, the thermal shrinkage tube 70 is shrunken and is tightened on the cable 90 with no space S. Accordingly, the cable 90 wrapped in the thermal shrinkage tube 70 is exactly tightened by the heated thermal shrinkage tube 70.

This manner may beforehand avoid the occurrences of inconveniences that when the cable is bent drawing the rapid curve or after the cable 90 is repeatedly bent, the inner circumferential face 73a of the thermal shrinkage tube 70 is peeled with respect to the outer circumferential face 93a of the cable 90 to make the spaces at the peeled parts, into which the water goes and extremely spoils the waterproof performance of the connector 1. As the thermal shrinkage tube, there is listed, for example, Thermofit thermal shrinkage tube made by Tico Electronics Leykem Inc., or thermal shrinkage rubber tube made by Shin Etsu Silicone Ltd. That of Tico Electronics Leykem Inc. is the radiation crosslink polyolefin.

By specifications of the cable 90, for example, as FIG. 3A, under the condition of having the space S between the peel prevention member 70 and the cable 90, the waterproof member (60) (FIG. 1) may be used.

By the specifications of the cable 90 or materials used to form respective members, the hardness of the insulation cover 93 of the cable 90, the same of the waterproof member 60, and that of the peel prevention member 70 are moderate hardness of flexibility. For example, if the peel prevention member 70 is formed by using a material to be a formed body having slightly higher hardness than that of the insulation cover 93 of the cable 90 or that of the waterproof member 60, when the cable 90 is bent, bent conditions around the peel prevention member 70 are moderate, and the waterproof member 60 is expected to be difficult to peel with respect to the cable 90.

Hardness of the resin formed body is measured by, for example, duro-meter (Type D) in accordance with JIS-K7215. The hardness of the insulation cover 93 of the cable 90 measured by the duro-meter (Type D) in accordance with JIS-K7215, falls in range between 48 and 58, and the cable 90 having the insulation cover 93 has appropriate flexibility.

In regard to one embodiment of the production method for composing the waterproof connector 1, explanation will be made in order of the producing processes. At first, the endless ring-shaped peel prevention member 70 is mounted on the end 93b of the insulation cover 93 of the cable 90. The conductors 91 of the cable 90 are forced to the crimp pieces 12a of the female terminals 10 such that the cable 90 and the female terminals 10a are connected under conductivity. Next, the female terminals 10 are inserted in the rear half part 41 of the inner housing 30. Then, the front holder 31 is attached to the rear half part 41 of the inner housing 30.

Subsequently, the hot melt mold is executed that the inner housing 30, the outer housing 50 and the cable 90 are set in the metal mold (not shown) into which, thereafter, poured is the synthetic polymer material such as the thermal plastic resin heated above a temperature shrinking the thermal shrinkage tube 70 (example: 120° C.), and the synthetic polymer material of the thermal plastic resin is cooled into solidification. This manner may concurrently perform the shrinking process of the thermal shrinkage tube 70 and the forming process of the waterproof member 60.

In regard to another embodiment of the production method for composing the waterproof connector 1, explanation will be made in order of the producing processes. At first, the endless ring-shaped peel prevention member 70 is mounted on the end 93b of the insulation cover 93 of the cable 90. The conductors 91 of the cable 90 are forced to the crimp pieces 12a of the female terminals 10 such that the cable 90 and the female terminals 10 are connected under conductivity. Next, the female terminals 10 are inserted in the rear half part 41 of the inner housing 30. Then, the front holder 31 is attached to the rear half part 41 of the inner housing 30.

Subsequently, the shrinking process of the thermal shrinkage tube 70 is executed that the inner housing 30, the outer housing 50 and the cable 90 are set in the metal mold (not shown), and thereafter, jigs and tools (not shown) heated above a temperature shrinking the thermal shrinkage tube 70 (example: 120° C.) are contacted to the thermal shrinkage tube 70. Then, the hot melt mold of the cable 70 is executed that the synthetic polymer material such as the thermal plastic resin is poured into the metal mold (not shown) and this is cooled into solidification. By the heated jigs and tools in the metal mold, the shrinking process of the thermal shrinkage tube 70 is performed with respect to the cable 70, so that the thermal shrinkage tube 70 is shrunken rapidly, exactly and precisely.

As mentioned above, the first aspect of the invention may beforehand avoid the occurrences of inconveniences such as extreme peelings of the waterproof member with respect to the cable being bent, the water invasion in the spaces made at the peeled parts, and spoiling of the waterproof performance thereby between the cable and the housing. When the cable is bent, this bending movement of the cable is restrained by the ring-shaped peel prevention member to avoid the peel progressing of the cable and the waterproof member, so that the waterproof performance may be secured accordingly.

According to the second aspect of the invention, since the waterproof member is formed with the hot melt material excellent in formability, the waterproof structure between the cable and the housing is efficiently composed. The peel prevention member is formed with the material having excellent adhesion to the hot melt material, and this may beforehand avoid the occurrences of inconveniences that when the cable is bent, the peel prevention member is peeled with respect to the waterproof member to make the spaces at the peeled parts, into which the water goes and spoils the waterproof performance of the connector.

According to the third aspect of the invention, after mounting the shrinkage tube on the cable, the shrinkage tube is tightened leaving no space between them, and the above mentioned structure may beforehand avoid the occurrences of inconveniences that when the cable is bent, the peel prevention member is peeled with respect to the waterproof member to make the spaces at the peeled part, into which the water goes and spoils the waterproof performance of the connector.

What is claimed is:

1. A waterproof cable and housing assembly, the assembly comprising:
   a housing;
   a cable received in the housing;
   a waterproof member securely fitted to the housing and the cable; and
   a peel-prevention member for preventing the waterproof member from separating from the cable while the cable is bent, the peel-prevention member being attached on the cable and completely surrounded by the waterproof member,
   wherein the peel-prevention member comprises a thermal shrinkage tube.

2. The assembly of claim 1, wherein the waterproof member is formed with a hot melt material, and the peel-prevention member is formed with a material configured to securely adhere to the hot melt material.

3. A waterproof cable and housing assembly, the assembly comprising:
   a housing;
   a cable comprising an insulating cover and a plurality of conductors, at least one of the plurality of conductors being received in the housing;
   a waterproof member securely fitted to the housing and the insulating cover of the cable; and
   a peel-prevention member for preventing the waterproof member from separating from the cable while the cable is bent, the peel-prevention member being attached on the insulating cover of the cable and being completely surrounded by the waterproof member,
   wherein the peel-prevention member comprises a thermal shrinkage tube.

* * * * *